United States Patent
Ransford, III

[11] 3,830,525
[45] Aug. 20, 1974

[54] TENSION LIMITING CLAMPING DEVICE
[76] Inventor: Herbert E. Ransford, III, Hunters' Lodge, Troy, Va. 22974
[22] Filed: Nov. 9, 1972
[21] Appl. No.: 304,945

[52] U.S. Cl............. 285/2, 285/311, 339/46, 339/75 R, 403/2
[51] Int. Cl............................................. H01r 13/62
[58] Field of Search........ 285/1, 2, 320, 311; 403/2, 403/17, 18, 322; 339/46, 75 R, 75 M

[56] References Cited
UNITED STATES PATENTS

| | | | |
|---|---|---|---|
| 317,030 | 5/1885 | Siddall | 285/311 |
| 1,361,856 | 12/1920 | Heininger | 285/311 |
| 1,793,015 | 2/1931 | Roos | 285/311 |
| 1,941,856 | 1/1934 | Fraley | 285/311 X |
| 1,957,805 | 5/1934 | Rich | 285/2 |
| 2,648,552 | 8/1953 | Livers et al. | 285/1 |
| 3,678,439 | 7/1972 | Vetter | 339/46 |

*Primary Examiner*—Werner H. Schroeder
*Attorney, Agent, or Firm*—Webb, Burden, Robinson & Webb

[57] ABSTRACT

A tension limiting clamping device suitable for maintaining the connection between high voltage cable coupler housings wherein the clamping device transmits tensile forces applied to the cable through its linkage members to a pair of shear pin stops. The shear pins will shear and cause the linkage members to releasably engage the coupler housings at a predetermined stress level which is lower than the rupture strength of the cable. The clamping device comprises a pair of connector arms adapted to be positioned on opposite sides of the cable coupler housings, each of said arms having a notched portion at one end thereof. The notched portions are adapted to detachably connect to attachment means associated with the first coupler housing. A pair of link members are pivotally attached at their first ends to the unnotched end portions of the aforementioned pair of connector arms and are also adapted to be pivotally attached at their second ends to opposite sides of the second coupler housing. A pair of shear pin stops are mounted on opposite sides of the second coupler housing, adjacent the pair of link members. Lever means are likewise provided, wherein movement of the lever means in a direction away from the first coupler causes the U-shaped handle to forceably engage the pivotal connections between the link members and connector arms whereby the notched portions of the connector arms draw the first coupler housing into mated engagement with the second coupler housing. In the closed position, the pair of link members rest against the shear pin stops in a position wherein the rearward pivotal connections with the pair of connector arms are located below the longitudinal centerline of the forward pivotal connections. At a stress level, lower than the rupture strength of the cable, the link members will be driven through the shear pin stops, thus causing the clamping device to disengage the coupler housings.

10 Claims, 9 Drawing Figures

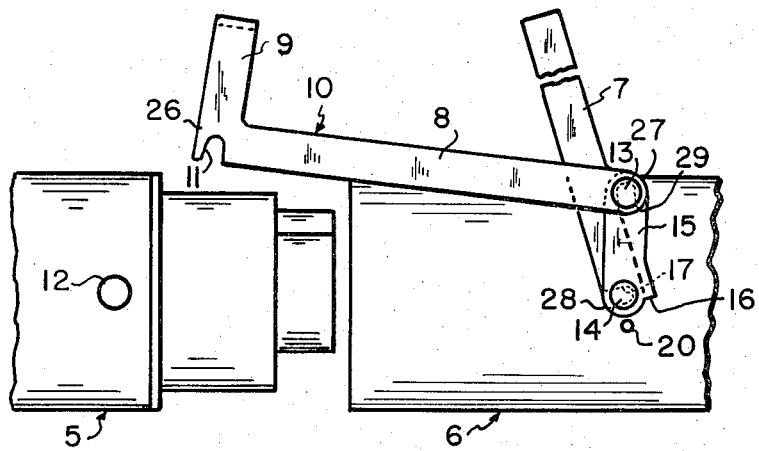
Fig. 1
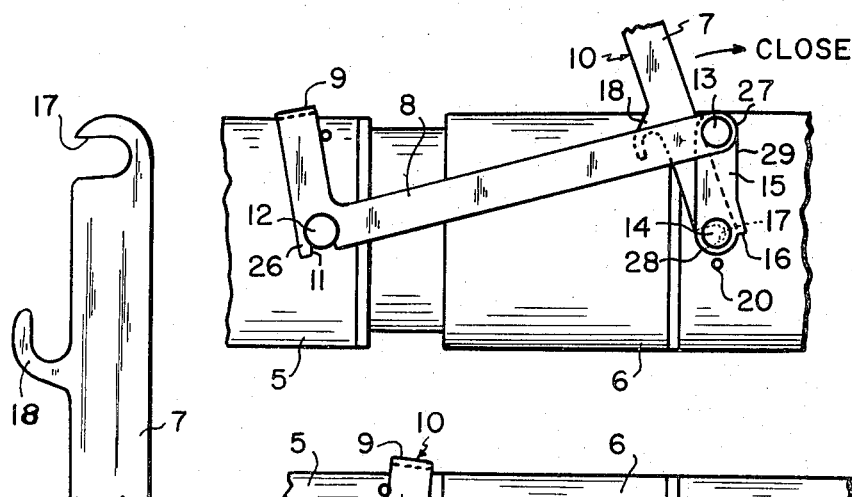
Fig. 2
Fig. 6
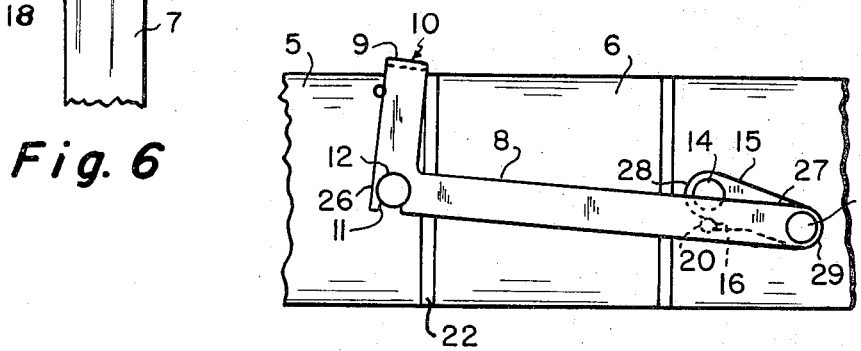
Fig. 3
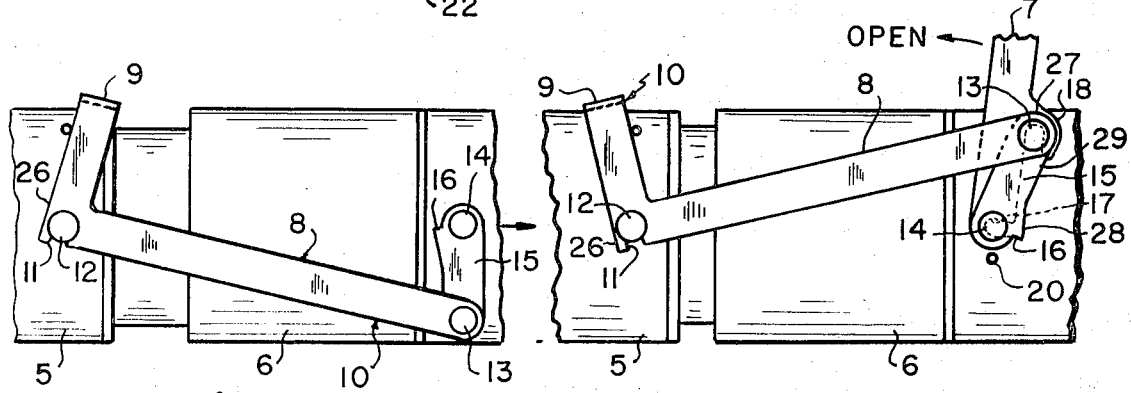
Fig. 4
Fig. 5

TENSION LIMITING CLAMPING DEVICE

SUMMARY OF THE INVENTION

My invention relates generally to clamping tools which are suited for making and maintaining the connection between electrical cables. More particularly, my invention relates to a clamping device for electrical cable couplers which will release the couplers at a predetermined level of tensile stress so as to prevent damage to the electrical cable. My invention relates to a tension limiting clamping tool particularly suited for maintaining the connection between high voltage electrical cable couplers, usually found in mining operations, of the general type disclosed in my co-pending patent application, Ser. No. 279,456.

In the mining industry, both surface and underground, it is necessary to transmit large amounts of electrical power, usually over long distances, in order to supply the needs of the mining equipment. Power is usually transmitted through flexible high voltage cable. The cable is generally in sections of from 500 to 1,000 feet in length. Interconnections between these sections of cable and between other electrical gear is generally made with male and female cable couplers mounted on the ends of each cable.

Heretofore, the joint between male and female cable coupler housings has been maintained by using a threaded "O" ring coupling collar at the coupler interface. This conventional O-ring clamping technique produces a very tight union between the two coupler housings; however, it does present a serious drawback. In mining operations, there are many instances where the point of power usage is moving, such as in the case with the continuous mining machine. When mining equipment of this type is moved further away from the power source, the high voltage cable supplying power to that piece of equipment will be pulled and dragged along the mine floor. If the cable or coupler housing becomes snagged on the mine floor or if there is an insufficient length of cable, a high tensile stress will immediately be applied to the cable. With the conventional threaded O-ring clamping collar there can be no relative movement between the heavy metal male and female coupler housings. Hence, if the tensile stress becomes large enough, the electrical cable will rupture, while the coupler housings remain in the joined position. In mining applications, the electrical cables may be carrying from 15,000 – 25,000 volts at up to 500 amps. Thus, it can be appreciated that if a cable were to rupture, it presents a serious safety hazard and also a serious economic problem.

My invention solves these problems by providing a clamping device adapted for joining and maintaining the connection between male and female cable coupler housings wherein the clamping device will automatically release the couplers at a stress level lower than that which would rupture the electrical cable.

My invention also provides a tension limiting clamping device suitable for maintaining the connection between cable coupler housings wherein the device transmits tensile forces applied to the cable through its linkage members to a pair of shear pin stops which will shear and cause the device to release at a predetermined stress level which is lower than the rupture strength of the cable.

My invention likewise provides a clamping device for maintaining the connection between cable coupler housings in which lever means in the form of a removable handle member and a locking handle member are included.

Briefly stated, my tension limiting clamping device comprises a pair of parallel spaced connector arms, adapted to be positioned on opposite sides of the mated first and second coupler housings, each of said connector arms having a notched portion at one end. The notched portions are adapted to detachably connect to attachment means positioned on the first coupler housing. A yoke member is attached near the notched portion of the connector arms so as to maintain the spacing of the connector arms. A pair of rigid link members are pivotally attached at their first ends to the unnotched ends of the connector arms and are adapted to be pivotally attached at their second ends to opposite sides of the second coupler housing. A pair of shear pins are positioned on opposite sides of the second coupler housing, adjacent the pair of link members. Lever means are likewise provided, said lever having a generally U-shaped handle which straddles the coupler housing while being adapted to be pivotally connected to either side of the second coupler housing. Movement of the lever means in a direction away from the first coupler causes the sides of the U-shaped handle portion to forceably engage the pivotal connections of the link members and connector arms whereby the notched portions of the connector arms draw the first coupler housing into mated engagement with the second coupler housing. Continued movement of the lever means pivotally forces the pair of link members, to a closed position whereby the link members come to rest against the shear pins. In the closed position, the link members rest in an "over center" position, wherein the rearward pivotal connections with the connector arms are below the longitudinal centerline of the forward pivotal connection. Hence, any tensional stress applied to the joined cables will cause the link members to force against the shear pins. At some stress level, lower than the rupture strength of the cable, the link members will be driven through the shear pins causing the clamping device to releasably disengage the coupler housings, thus preventing damage to the cable.

Also included are means for releasably opening the clamping device without harming the shear pins. In addition, the lever means may include a removable handle or a permanent handle; the permanent handle may be locked in the closed position to prevent unauthorized opening of the clamp.

In the accompanying drawings, I have shown the presently preferred embodiments of my invention in which:

FIG. 1 is a side elevation showing the cable coupler housings about to be joined and the clamping device of this invention operably mounted on one of the coupler housings;

FIG. 2 is a side elevation, similar to FIG. 1, showing the clamping device of this invention operably joining the two cable coupler housings;

FIG. 3 is a side elevation, similar to FIGS. 1 and 2, showing the clamping device of this invention in the fully closed position with the lever means removed;

FIG. 4 is a side elevation, similar to FIGS. 1–3, showing the clamping device of this invention as it would appear in the release position when excess tensile stress is applied to the cable;

FIG. 5 is a side elevation, similar to FIGS. 1–3, showing the clamping device of my invention and the removable lever means in operable position for opening the clamping device;

FIG. 6 is a side elevation of a portion of the removable lever means of FIGS. 2 and 5;

Reference will now be made to the specific details of the drawings, wherein like parts will be designated by the same numerals throughout the various views and similar parts will be designated by primed numbers.

Figure 7:
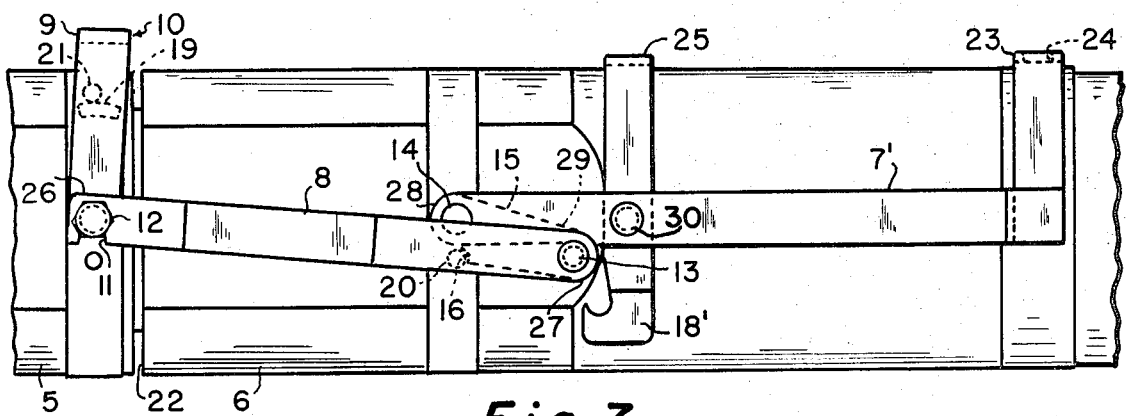
FIG. 7 is a side elevation showing an additional presently preferred embodiment of the clamping device of this invention in the fully closed position.

Referring now to FIG. 1, the tension limiting clamping device of my invention, generally designated 10, is shown operably mounted on the second cable coupler housing 6. The first cable coupler housing 5 is shown as it would appear prior to being joined with coupler housing 6. The clamping device 10 comprises a pair of parallel spaced connector arms 8 adapted to be positioned on either side of the coupler housings, as can be best seen in the plan view of FIG. 8. The pair of connector arms 8 each have a first end portion 26 and a second end portion 27. Each first end portion 26 has a notched portion 11, as shown in FIG. 1. The notched portions 11 are adapted to releasably engage attachment means associated with the first coupler housing 5. The attachment means may be in the form of an outwardly extending projection or lug. Preferably, the attachment means is in the form of a pair of bolts 12 which are threadably mounted within drilled and tapped holes on opposite sides of the first coupler housing 5, FIGS. 8 and 9. The notched portions 11 of the connector arms 8 fit onto the shank portions of the bolts 12.

A pair of rigid ink members 15 are also included, each having a first end portion 28 and a second end portion 29. The link members 15 are adapted to be pivotally attached at their first end portions 28 to opposite sides of the second coupler housing 6. The attachment being made by way of pivotal connections 14. The pivotal connections preferably are made directly to the sides of housing 6 by conventional headed fasteners such as a bolt. The second end portions 29 of the link members 15 are pivotally connected to the second end portions 27 of the connector arms 8 by way of pivotal connections 13. Pivotal connections 13 may likewise be made by using conventional fasteners. The pair of link members 15 may also include an outwardly extending shoulder portion 16 positioned adjacent the first ends 28. The function of shoulder portions 16 will be discussed in greater detail below.

A pair of shear pins 20 are fixedly positioned on opposite sides of the second coupler housing 6. Shear pins 20 are positioned below pivotal connections 14 of link members 15. Shear pins 20 extend outwardly from the sides of housing 6 a sufficient distance so that they will impinge upon the edges of shoulder portions 16 of links 15, thus preventing the complete movement of links 15 about pivotal connections 14. The shear pins 20 may be the conventional tapered type and preferably are mounted into the sides of second housing 6 by way of a force fit into drilled holes. The shear pin mounting holes should preferably be drilled completely through the walls of the coupler housing 6 so as to permit removal and replacement of the pins 20 in the event they are sheared during use.

Figure 9:
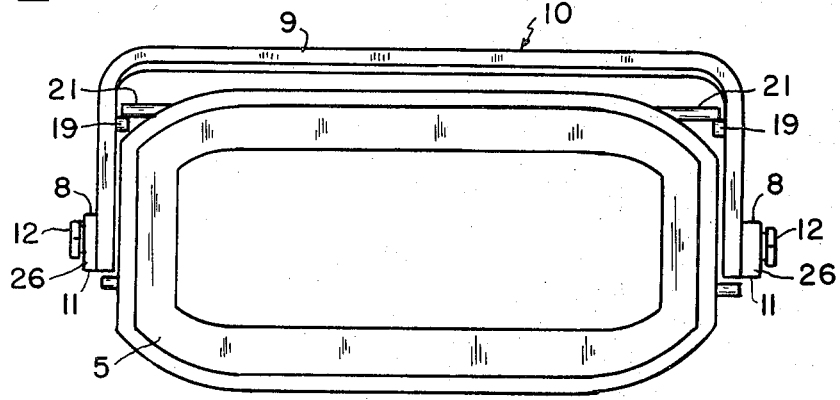
FIG. 9 is a sectional view taken along line IX—IX of FIG. 8.

The connector arms 8 may also include yoke member 9, which is generally U-shaped so as to straddle the top and sides of the coupler housing 5. Yoke member 9 is rigidly attached to each of the first end portions 26 of the connector arms 8 upwardly extending above notched portions 11 thereof. Yoke member 9 maintains the spaced relationship between the notched portions 11 of the pair of connector arms 8. As shown in FIGS. 7 and 9, yoke member 9 may also include a pair of retaining webs 19 positioned on either side of the U-shaped yoke 9 and extending toward the coupler housing 5. Associated with the second coupler housing 5, may be a pair of retaining pins 21 which are mounted on opposite sides of the housing 5 and outwardly extending therefrom toward the sides of yoke 9. Retaining pins 21 are positioned slightly above retaining webs 19 so as to prevent the accidental upward release of notches 11 from engagement with attachment bolts 12. As can best be seen in FIG. 7, the upward release of notches 11 from attachment bolts 12 can only be achieved by upward or downward pivotal movement of connector arms 8 which, in turn, pivotally moves retaining webs 19 of yoke 9 out of blocking alignment with retaining pins 21.

Figure 8:
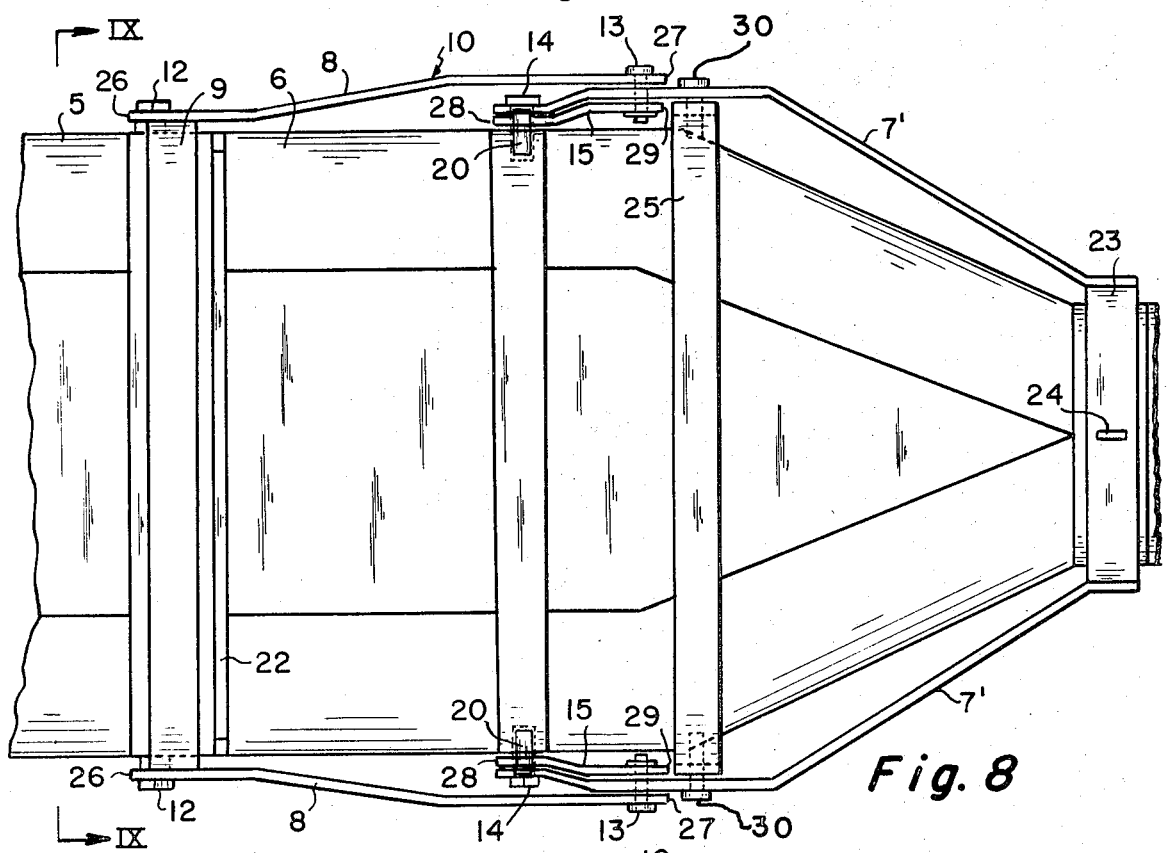
FIG. 8 is a plan view of the device shown in FIG. 7.

The clamping device 10 also includes lever means to aid in opening and closing the device. A first presently preferred embodiment of the lever means is shown in FIGS. 2–6 wherein the lever means is in the form of a detachable handle member 7. A second presently preferred embodiment of the lever means is shown in FIGS. 7 and 8 wherein the lever means is a permanently attached handle member 7'.

Reference will first be made to the permanently attached handle member 7' of FIGS. 7 and 8. Handle member 7' is generally U-shaped so as to straddle the top and sides of second coupler housing 6. Handle member 7' is pivotally connected at its open end to opposite sides of second coupler housing 6 by way of pivotal connections 14. Preferably, handle member 7' is mounted on pivotal connections 14 such that link members 15 are positioned nearer to the housing 6, FIG. 8. When the handle member 7' is mounted in this manner, it is positioned between the link members 15 and the connector arms 8; hence, the edges of handle 7' are in contact with pivotal connections 13 on both sides of housing 6. In operation, the clamping device 10 would be closed in the manner similar to that depicted in FIG. 2. Movement of handle member 7 in a direction away from the first housing 5 causes the handle member 7 or 7' to forceably engage the pivotal connections 13 of the link members 15 and connector arms 8, causing the notched portions 11 of connector arms 8 to pull the first coupler housing 5 into mated engagement with housing 6. During the closing operation of clamping device 10, it is important to note that no forces are applied to the shear pins 20. Hence, great force can be applied, during the closing operation, to the handle 7, link members 15, connector arms 8 and attachment bolts 12, without the danger of premature shearing of pins 20. In the fully closed position, handle member 7' is pushed to a position wherein it is substantially aligned with the longitudinal centerline of pivotal connections 14, FIG. 7. When the handle member 7' is in this fully closed position, pivotal connections 13 of the link members 15 and connector arms 8 are positioned below the longitudinal centerline of pivotal connections 14. Further downward clamping movement of the link members 15 and connector arms 8 is prevented by the shear pins 20 which impinge against shoulder portions 16 of link members 15. Handle member 7' may also include a yoke member 23 which is generally U-shaped, so as to straddle the top and sides of the second coupler housing 6. Yoke 23 is attached to the outer end of handle member 7' in order to maintain the spacing of member 7' and also aids as a gripping means in operating the handle.

It can be recognized, in FIG. 7, that yoke 23 also prevents the handle member 7' from moving past the longitudinal centerline of pivotal connection 14, in the closed position. By limiting further movement of member 7', there will be no extra forces applied to shear pins 20 during the closing operation. Hence, the pins 20 cannot be accidentally sheared while operating handle member 7'.

Yoke 23 may also have locking means associated therewith so that the handle member 7' may be protected against unauthorized opening. The locking means may be in the form of a slot 24 through yoke 23. Coupler housing 6 could have a locking latch (not shown) which would be adapted to fit through slot 24 in order to lockably secure the yoke 23 in place on coupler housing 6.

Referring still to FIG. 7 handle member 7' may also include release means for the purpose of removing clamping device 10 from the housings 5 and 6 without destroying shear pins 20. A release yoke 25 is provided which is generally U-shaped so as to fit over the top and sides of the second coupler housing 6. The release yoke 25 has release hooks 18' formed at the open ends thereof, said hooks 18' being positioned on opposite sides of the housing 6. Release yoke 25 is pivotally connected above hooks 18' to handle member 7' by pivotal connections 30. With handle member 7' in the closed position, hooks 18' are slightly below and rearward of pivotal connections 13. In order to release the clamping device 10 from the coupler housings 5 and 6, the handle member 7' and yoke 23 are raised slightly so as to position release hooks 18' adjacent pivotal connections 13. Once in this position, hooks 18' can be pivotally moved, by way of pivotal connections 30, into hooked engagement with pivotal connections 13. Continued upward movement of handle member 7' toward the first coupler housing 5 causes link members 15 and connector arms 8 to pivotally move upwardly and toward the first housing 5, thus releasing the clamping device 10 from attachment bolts 12.

Another presently preferred embodiment of the lever means is depicted in FIGS. 2–6, wherein the lever means is in the form of detachable handle member 7. Detachable handle member 7 is very similar to the aforementioned handle member 7' in that it is generally U-shaped so that it can operably straddle the top and sides of second cable coupler housing 6. The main structural feature of detachable handle member 7 can best be seen in FIG. 6. The open ends of handle member 7 each have a notched portion 17 which is adapted to detachably engage pivotal connection 14 of the link member 15 and the second coupler housing 6. Handle member 7 also has a pair of release hooks 18 positioned in spaced relationship from the notched portions 17. Each release hook 18 is adapted to releasably attach to pivotal connection 13 between link member 15 and connector arm 8, FIG. 5. With hook 18 in this position, the clamping device 10 can be opened.

If the handle member 7 is reversed, with hook portions 18 facing away from pivotal connections 13, as shown in FIG. 2, the clamping device 10 may be closed by forcing the handle 7 against pivotal connections 13 in a direction away from the first coupler housing 5. Once the clamping device 10 has been closed, handle member 7 may be removed by unhooking the notched portions 17 from pivotal connections 14. The clamping device 10 would then appear, as depicted in FIG. 3 with the handle removed.

It should be noted, also, that it is preferable to include a rubber sealing gasket at the mating interface 22 between the two cable coupler housings 5 and 6, FIG. 3. Not only does the rubber gasket aid in keeping the joined couplers free from moisture and dirt, but it also acts as a resilient means which allows the link members 15 and connector arms 8 to be clamped into place more easily as they are pivotally moved across the longitudinal centerline of the pivotal connections 14 of the link members 15 and housing 6.

The tension limiting clamping device 10 is shown in the closed position in FIGS. 3 and 7. The removable handle 7 embodiment of FIG. 3 and the permanent handle 7' embodiment of FIG. 7 both function identically when an excess tensional stress is applied to the electrical cables and coupler housings 5 and 6. Due to the fact that pivotal connections 13 of the link members 15 and connector arms 8 are below the longitudinal centerline of pivotal connections 14, any tensional forces applied to the cable and couplers 5 and 6 would urge link members 15 and connector arms 8 in a downward direction, thus forcing link members 15 against the shear pin stops 20. Preferably, shear pins 20 should be of sufficient strength to withstand the normal stresses which are applied during usual working conditions. The shear pins 20, however, should be preselected to fracture at a stress level lower than that which would cause damage to the cable or cable coupler - cable interconnections. Once the stress applied to the cable reaches the critical level, the link members 15 forceably shear through pins 20, FIG. 4. As shear pins 20 are fractured, link members 15 move pivotally downward and then forward around pivotal connections 14. This movement, likewise, causes connector arms 8 to move toward the first coupler housing 5, allowing notched portions 11 to release from engagement with attachment bolts 12, thus releasing the clamping device 10 and preventing the possibility of any cable damage.

While the preferred embodiments of the present invention have been shown and described herein, it is obvious that many structural details may be changed without departing from the spirit and scope of the appended claims. It is likewise understood that the device of my invention, while described as a clamp for electrical cable couplers, may also find use in other applications where a tension limiting clamp is desired.

I claim:

1. A tension limiting clamping device for making, breaking and maintaining the connection between a first cable coupler housing and a second cable coupler housing, which comprises:

A. attachment means rigidly positioned on opposite sides of and outwardly extending from the first cable coupler housing;
  B. a pair of longitudinally extending connector arms adapted to be positioned in parallel, spaced relationship on opposite sides of the coupler housings, each of said connector arms having a first end and a second end, each of said connector arms also having a notched portion at the first end thereof, said notched portions adapted to detachably connect to the attachment means of the first coupler housing;
  C. a pair of rigid link members adapted to be positioned on opposite sides of the second coupler housing, each of said link members having a first end portion and a second end portion, said pair of link members being pivotally attached at their respective second end portions to the second end portions of the aforementioned pair of connector arms, said pair of link members also adapted to be pivotally mounted at their respective first end portions on opposite sides of the second cable coupler housing;
  D. a pair of shear pins adapted to be fixedly mounted on opposite sides of the second coupler housing, adjacent the aforementioned link members, outwardly extending from said housing so as to act as a stop for said link members when the clamping device is closed;
  E. lever means adapted to be pivotally operable about the second cable coupler housing, said lever means aligned such that it may forceably engage the respective pivotal connections of the link members and the connector arms on opposite sides of the second coupler housing when said lever means is moved in a direction away from the first cable coupler housing, whereby continued movement of the lever means causes the notched end portions of the connector arms, when said notched ends are positioned on the attachment means, to pull the first coupler housing into mated engagement with the second coupler housing and likewise causes the link members to be pivotally urged into a closed position wherein said members are resting against the aforementioned pair of shear pins with the pivotal connections of said link members and said connector arms in a position below the longitudinal centerline of the pivotal connections of the link members and the second coupler housing.

2. The tension limiting clamping device of claim 1 wherein the lever means is permanently attached to the second coupler housing and comprises a handle member which is generally U-shaped to straddle opposite sides of the second cable coupler housing, said handle member also including a yoke member at one end thereof which straddles the top and sides of the second coupler housing and maintains the lateral spacing of said handle member, the handle member is pivotally attached to opposite sides of the second coupler housing, positioned such that when the handle member is moved in a direction away from the first coupler housing, the handle member will forceably engage the respective pivotal connections of the link members and the connector arms on opposite sides of the second coupler housing, continued movement of the handle member forces the link members into a closed position against the shear pin stops.

3. The tension limiting clamping device of claim 2 wherein the permanently attached handle member has locking means associated with the yoke member whereby said yoke member may be lockably secured in the closed position to the second cable coupler housing so as to prevent unauthorized opening of the clamping device.

4. The tension limiting clamping device of claim 2 wherein the permanently attached handle member also includes a release yoke, said release yoke being generally U-shaped so as to fit over the top and sides of the second coupler housing, said yoke also having a pair of release hooks formed on its open ends, the release yoke being pivotally mounted to the handle member so as to straddle opposite sides of the second coupler housing when the handle member is in the closed position, the release hooks of the yoke when in the closed position, are positioned adjacent and below the pivotal connections of the link members and connector arms such that the clamping device may be releasably opened by first raising the handle member a distance, then pivotally moving the release hooks into hooked engagement with the adjacent pivotal connections of the link members and connector arms, whereby continued movement of the handle member in a direction toward the first coupler housing causes the clamping device to releasably disengage.

5. The tension limiting clamping device of claim 1 wherein the lever means is detachably connected to the second coupler housing and comprises a handle member which is generally U-shaped so as to straddle the top and sides of the second coupler housing, the open ends of said handle member having notched portions which are adapted to detachably connect to opposite sides of the second coupler housing, the handle member, when pivotally moved in a direction away from the first coupler housing, will forceably engage the respective pivotal connections of the link members and the connector arms on opposite sides of the second coupler housing, continued movement of said handle forces the link members into a closed position against the shear pin stops whereupon the handle member may be releasably detached from the second coupler housing.

6. The clamping device of claim 5 wherein the detachable handle member includes a pair of release hooks positioned on opposite sides of the U-shaped handle, positioned in spaced relationship from the aforementioned notched portions, said release hooks being spaced in relation to said notched portions whereby said hooks may hookably engage the pivotal connections of the link members and connector arms on opposite sides of the second coupler housing when the notched portions are pivotally engaging the second coupler housing such that the clamping device may be releasably opened by moving the handle member in a direction toward the first coupler housing.

7. The clamping device of claim 1 wherein the pair of link members each include a shoulder portion outwardly extending therefrom and positioned adjacent the pivotal connections of the link members and the second coupler housing so as to forceably engage the shear pin stops on opposite sides of the second coupler housing when the link members are in the closed position.

8. The clamping device of claim 1 wherein the pair of connector arms includes a rigid yoke member, generally U-shaped so as to straddle the top and sides of the first coupler housing, said yoke member being attached to the first end portions of the connector arms and upwardly extending above the notched portions thereof, whereby the lateral spacing of said notched portions is maintained in aligned relationship with the attachment means of the first coupler housing.

9. The clamping device of claim 8 wherein the pair of connector arms includes a rigid U-shaped yoke member having a pair of retaining webs positioned on opposite sides of said yoke and extending toward the first coupler housing, said retaining webs being adapted to blockingly engage a pair of housing mounted retaining pins which are positioned above said retaining webs, whereby the upward release of the notched portions from the attachment means can be achieved only by upward or downward pivotal movement of the connector arms.

10. The clamping device of claim 1 wherein the attachment means associated with the first coupler housing includes a pair of headed bolts, mounted on opposite sides of said first housing and outwardly extending therefrom.

* * * * *